United States Patent
Kurayoshi et al.

(10) Patent No.: US 6,910,716 B2
(45) Date of Patent: Jun. 28, 2005

(54) FUEL TANK MOUNTING STRUCTURE FOR MOTORCYCLES

(75) Inventors: Yoshiyuki Kurayoshi, Saitama (JP); Satoshi Hirayanagi, Saitama (JP); Naohisa Hirao, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/649,795

(22) Filed: Aug. 28, 2003

(65) Prior Publication Data

US 2004/0124628 A1 Jul. 1, 2004

(30) Foreign Application Priority Data

Sep. 10, 2002 (JP) ........................................ 2002-263891

(51) Int. Cl.[7] .................................................. B60P 3/22
(52) U.S. Cl. ..................................................... 280/835
(58) Field of Search ................................ 280/833, 834, 280/835, 830

(56) References Cited

U.S. PATENT DOCUMENTS

| | | | | |
|---|---|---|---|---|
| 3,926,274 A | * | 12/1975 | Morioka et al. | ............ 180/219 |
| 4,223,899 A | * | 9/1980 | Krieger | ....................... 280/834 |
| 5,791,431 A | * | 8/1998 | Asao et al. | .................. 180/311 |
| 6,067,945 A | * | 5/2000 | Fukuda et al. | .................. 123/2 |
| 2001/0028168 A1 | * | 10/2001 | Nakagawa | .................. 280/830 |

FOREIGN PATENT DOCUMENTS

| | | | |
|---|---|---|---|
| JP | 60-92928 A | | 5/1985 |
| JP | 08-018585 B | * | 2/1996 |
| JP | 9-76972 A | | 3/1997 |
| JP | 2000-219181 A | | 8/2000 |

* cited by examiner

*Primary Examiner*—Kevin Hurley
(74) *Attorney, Agent, or Firm*—Birch Stewart Kolasch & Birch, LLP

(57) ABSTRACT

To avoid exertion of an external force on a fuel tank as much as possible. A mounting structure of a fuel tank for a motorcycle provides a fuel tank that is disposed between a pair of left and right frame members of a vehicle body frame and the fuel tank is mounted on the vehicle body frame at a first mounting portion and second, third, and fourth mounting portions. The fuel tank is mounted at each of the mounting portions via a plurality of tubular resilient bodies. The first mounting portion allows resilient support in the fore-and-aft direction and in the vertical direction of the vehicle and limits the lateral movement. The second, third, and fourth mounting portions allow resilient support in the fore-and-aft direction and in the vertical direction of the vehicle.

18 Claims, 8 Drawing Sheets

FUEL TANK MOUNTING STRUCTURE FOR MOTORCYCLES

CROSS-REFERENCE TO RELATED APPLICATIONS

The present application claims priority under 35 USC 119 to Japanese Patent Application Nos. 2002-263891 filed on Sep. 10, 2002 the entire contents thereof are hereby incorporated by reference.

BACKGROUND OF THE INVENTION

1. Field of the Invention

The present invention relates to an improvement of a fuel tank mounting structure for a motorcycle.

2. Description of the Background Art

A mounting structure of a fuel tank on a vehicle body frame for a motorcycle is known as disclosed in Japanese Patent Document No. JP-B-8-18585 (P.3–4, FIGS. 1–4).

According to Japanese Patent Document No. JP-B-8-18585 (P.3–4, FIGS. 1–4), a fuel tank mounting structure in the related art is such that a fuel tank is resiliently supported in the fore-and-aft direction, in the downward direction, and in the lateral direction by a vehicle body frame. The fuel tank is clamped laterally from both sides by resilient members provided on left and right frame members by inserting the fuel tank between a pair of left and right frame members of the vehicle body frame from above.

However, in the fuel tank mounting structure in the related art, the fuel tank is secured to the vehicle body frame by laterally clamping the fuel tank from both sides by the resilient members provided on the left and the right frame members. Therefore, when an external force is exerted on the vehicle body frame laterally of the vehicle, the external force is exerted on the fuel tank from the frame members via resilient bodies. It is preferable to avoid exertion of such an external force on the fuel tank as much as possible in order to support the fuel tank stably on the vehicle body frame.

SUMMARY AND OBJECTS OF THE INVENTION

Accordingly, an object of the present invention is to provide a technology that can avoid the exertion of an external force on a fuel tank as much as possible to support a fuel tank stably on the vehicle body frame.

In order to achieve the object described above, the present invention is directed to a fuel tank mounting structure for a motorcycle wherein a fuel tank is disposed between a pair of left and right frame members of a vehicle body frame and the fuel tank is mounted on the vehicle body frame via a plurality of tubular resilient bodies. The plurality of tubular resilient bodies are disposed with the axes of the tubular resilient bodies extending laterally of the vehicle. At least one of the plurality of resilient bodies allows for the resilient support in the fore-and-aft direction and in the vertical direction of the vehicle and limits the movement in the lateral direction. The remaining resilient bodies allow resilient support in the fore-and-aft direction and in the vertical direction of the vehicle.

Even when an external force is exerted on the left and the right frame members laterally of the vehicle, the external force is not exerted on the fuel tank via the resilient bodies from the frame member.

In addition, since at least one resilient body allows resilient support in the fore-and-aft direction and in the vertical direction of the vehicle and limits the movement in the lateral direction, the position of the fuel tank with respect to the vehicle body frame can easily be determined.

Furthermore, since a tank mounting member does not exist in front and behind the fuel tank, spaces in front and behind the tank can effectively be used.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Referring now to attached drawings, an embodiment of the present invention will be described below. Terms "front," "rear," "left," "right," "up" and "down" refer to the directions viewed from a driver.

Figure 1:
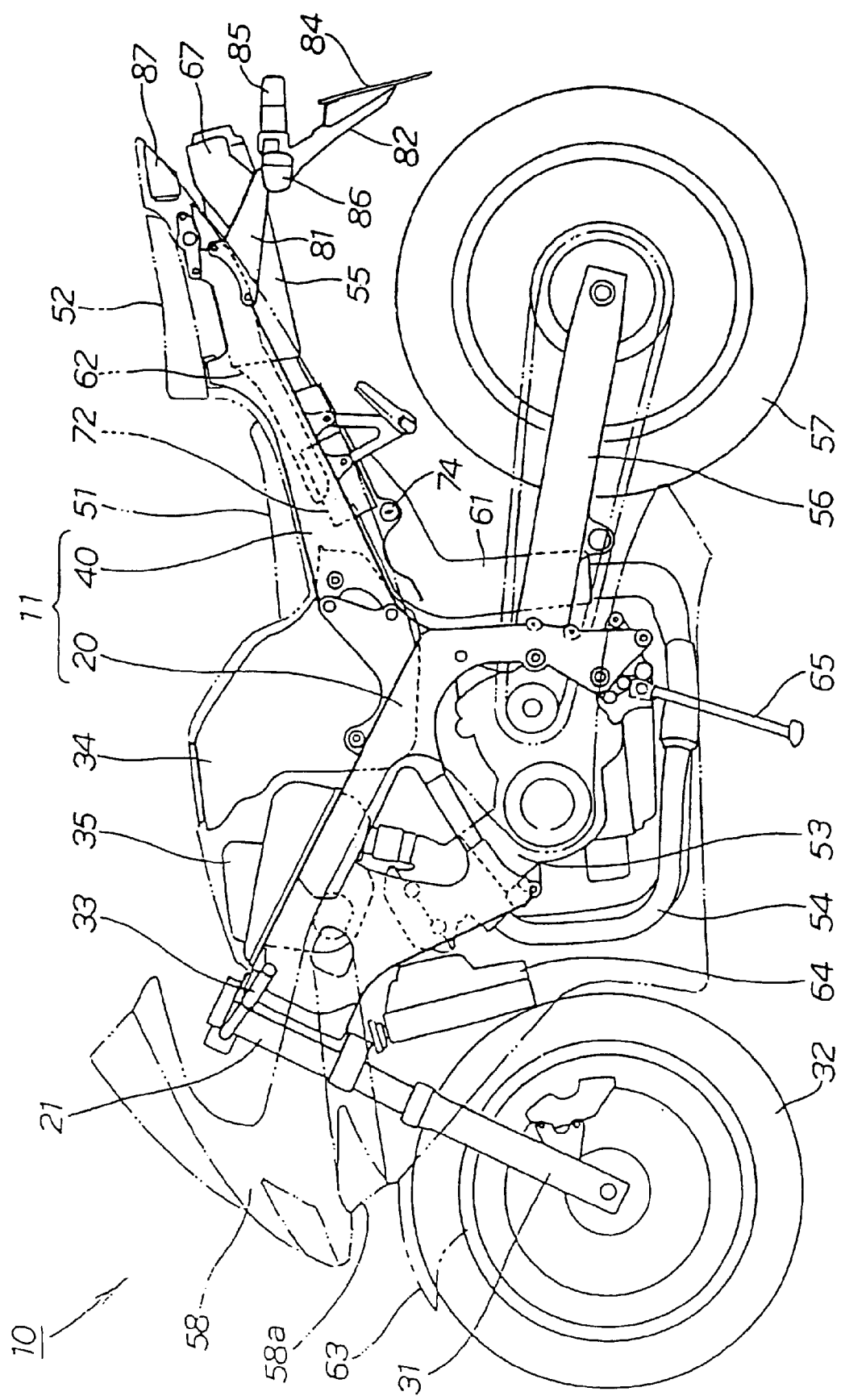
FIG. 1 is a left side view of a motorcycle according to the present invention.

FIG. 1 is a left side view of a motorcycle according to the present invention. A motorcycle 10 mainly includes a cradle type vehicle body frame 20, a front fork 31 mounted to a head pipe 21 of the vehicle body frame 20, a front wheel 32 attached to the front fork 31, a handle 33 connected to the front fork 31 and a fuel tank 34 and an air chamber 35 mounted on the vehicle body frame 20. A seat rail 40 extends rearwardly from the vehicle body frame 20 with a front seat 51 and a rear seat 52 mounted on the seat rail 40. A four-cycle engine 53 is disposed in a cradle space of the vehicle body frame 20 with a muffler 55 connected to an exhaust port of the engine 53 via an exhaust pipe 54. A swing arm 56 is suspended by a rear shock absorber (not show) from the rear portion of the vehicle body frame 20 with a rear wheel 57 attached to the swing arm 56. A vehicle body 11 is covered with a cowl 58 indicated by imaginary lines, that is, a vehicle of the full cowling type.

The vehicle body 11 includes the vehicle body frame 20 and the seat rail 40. The seat rail 40 is a rear frame supporting a seat (front and rear seats 51, 52). A driver can sit on the front seat 51 and a fellow passenger can sit on the rear seat 52.

The exhaust pipe 54 is a metal pipe starting from the exhaust port provided on the front portion of the engine 53, passing under the engine 53 and extending rearwardly of the vehicle body frame 20, and from the rear end thereof, extending upwardly along the vehicle body frame 20, and from the upper end thereof, extending along the seat rail 40 to the muffler 55. A heat shielding pipe 61 is provided for covering the exhaust pipe 54. A heat shielding plate 62 is provided for covering the upper portion of the muffler 55. A protector 67 is provided for covering the left and the right rear portions of the muffler 55. The protector 67 is a protecting plate mounted to a stay 81 for mounting a rear fender 82.

As described above, in the motorcycle 10, the front wheel 32, the engine 53, and the rear wheel 57 are mounted from the front to the rear in this order on the vehicle body 11. The exhaust pipe 54 extends rearwardly from the engine 53 with the muffler 55 being attached at the rear end of the exhaust pipe 54. The muffler 55 is disposed on the rear portion of the vehicle body frame 20 between the left and the right seat rails of the seat rail 40 above the rear wheel 57.

In FIG. 1, a front fender 63, a radiator 64, a stand 65, a battery 72, a key cylinder 74, a rear fender 82, a number plate 84, a license plate lamp 85, a blinker 86 and a tail lamp 87 are mounted on the vehicle body.

Figure 2:
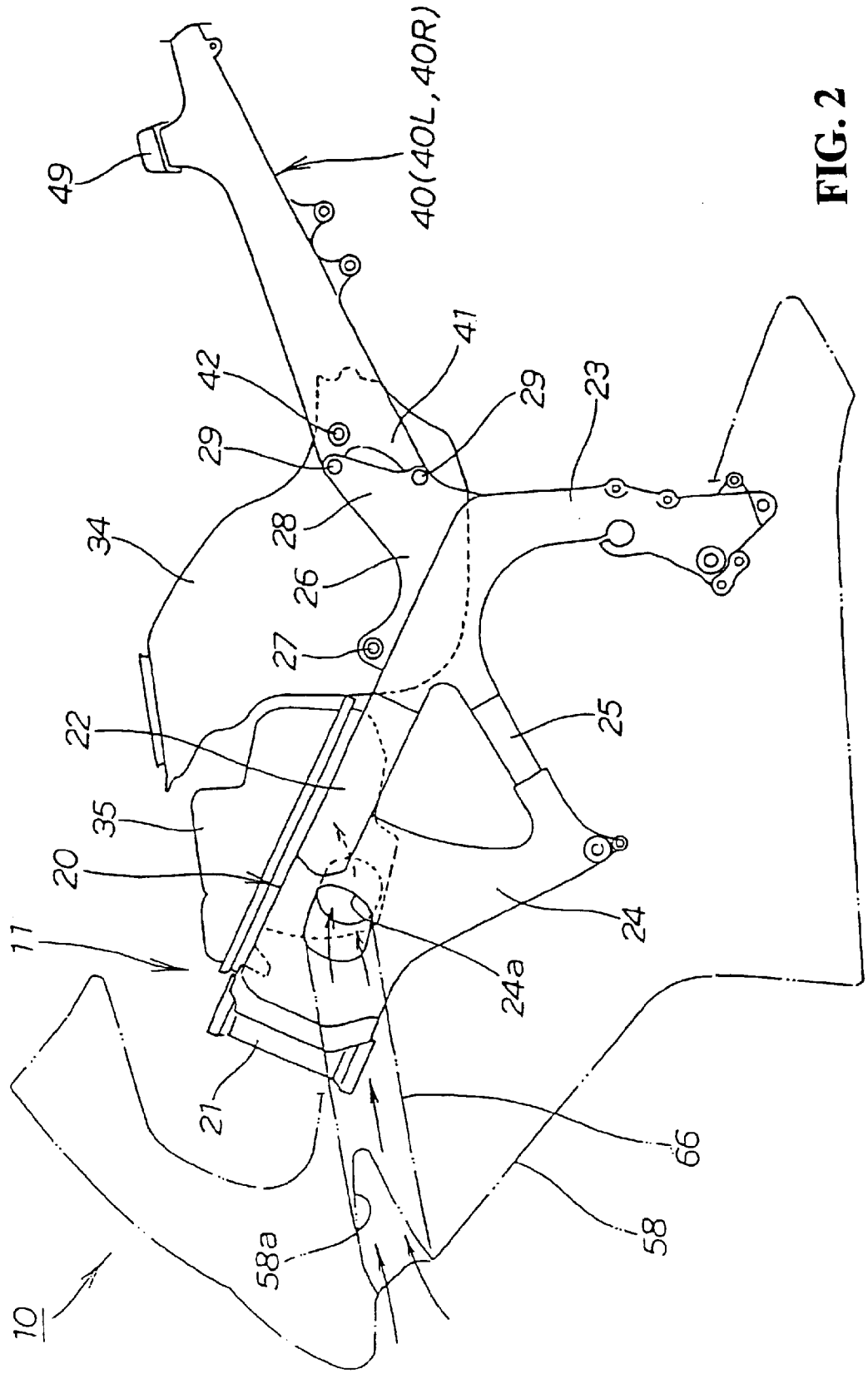
FIG. 2 is a left side view of a vehicle body according to the preset invention.
Figure 3:
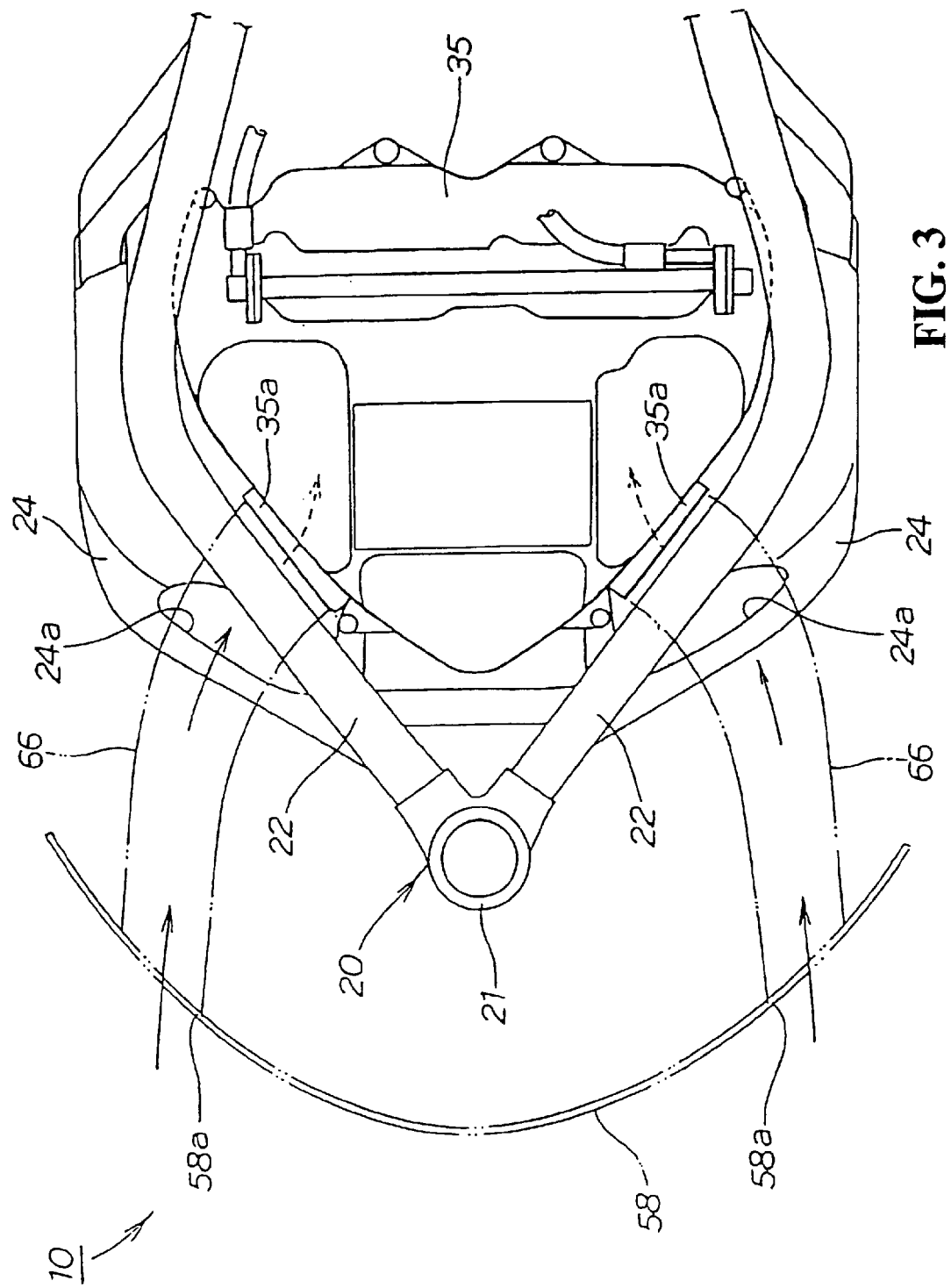
FIG. 3 is a plan view of the vehicle body according to the present invention.

FIG. 2 is a left side view of a vehicle body according to the present invention, and FIG. 3 is a plan view of the vehicle body according to the present invention. In FIG. 2 and FIG. 3, the vehicle body frame 20 includes a head pipe 21, left and right main frames 22, 22 extending rearwardly from the head pipe 21, left and right center frames 23, 23 extending downwardly from the rear ends of the main frames 22, 22 (only the left center frame is shown in the figure, hereinafter), left and right down frame 24, 24 extending from the head pipe 21 and the front portions of the main frames 22, 22 obliquely downwardly toward the rear, left and right upper frames 25, 25 extending from the lower ends of the down frames 24, 24 toward the rear portions of the main frames 22, 22, and a plurality of cross members, which are not shown in the drawing. Part or all these frame components are formed by casting.

The down frames 24, 24 includes left and right through holes 24a, 24a at the front portions thereof so as to communicate the inside and the outside. Air intake pipes 66, 66 shown by imaginary lines can be inserted through these through holes 24a, 24a. The air intake pipes 66, 66 connect air vents 58a, 58a formed on the front portion of the cowl 58 and the air intake ports 35a, 35a of the air chamber 35. Alternatively, the through holes 24a, 24a may be utilized as parts of the air intake pipes 66, 66.

The vehicle body frame 20 are supporting members including left and right brackets 26, 26 extending upwardly from the rear upper portions of the left and the right main frames 22, 22. The left and the right brackets 26, 26 include fuel tank supporting portions 27, 27 on the front portions thereof and seat rail mounting portions 28, 28 on the rear portions thereof. By mounting the seat rail 40 to the seat rail mounting portions 28, 28 via bolts 29, the seat rail 40 can extend rearwardly from the upper rear portion of the vehicle body frame 20. The fuel tank supporting portions 27, 27 are through holes pierced laterally of the vehicle.

Figure 4:
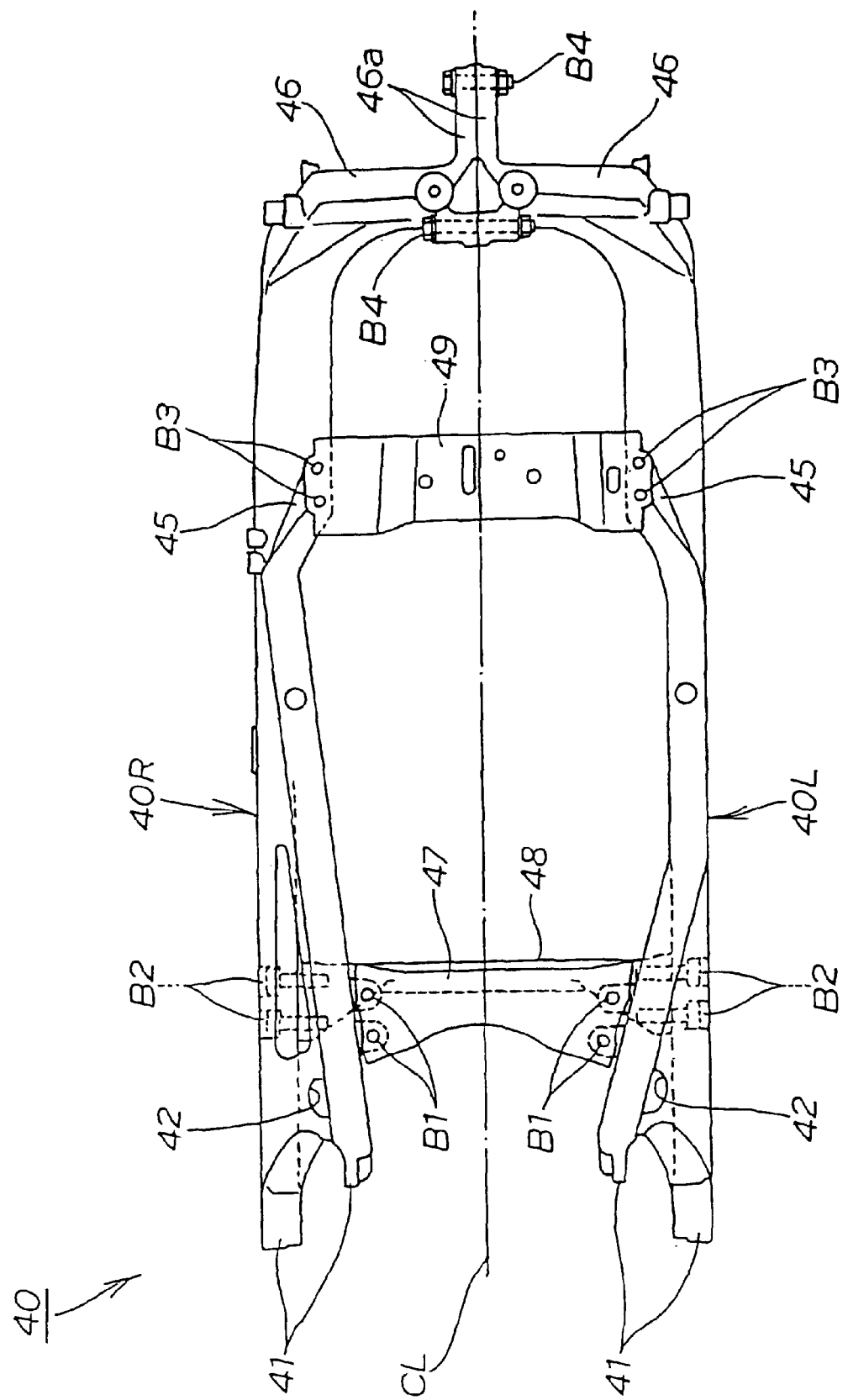
FIG. 4 is a plan view of a seat rail according to the present invention.
Figure 5:
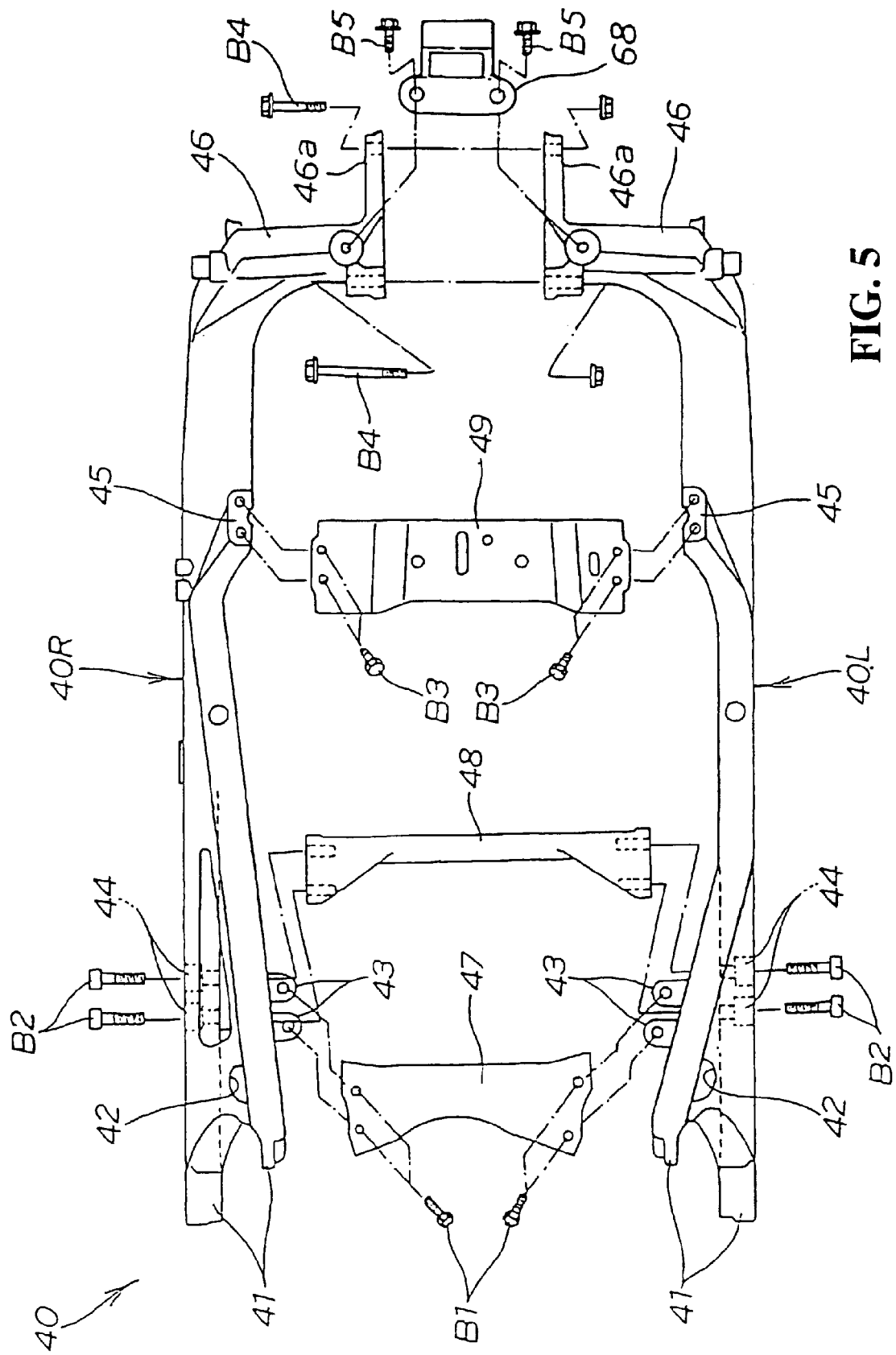
FIG. 5 is an exploded view of the seat rail according to the present invention.

FIG. 4 is a plan view of the seat rail according to the present invention, and FIG. 5 is an exploded drawing of the seat rail according to the present invention.

The seat rail 40 includes a left seat rail 40L and a right seat rail 40R divided along the centerline CL of the vehicle and extending in the longitudinal direction. Three cross members, that is, an upper front cross member 47, a lower front cross member 48, and a rear cross member 49, are disposed in this order from the front to the rear across the left and the right seat rails 40L, 40R.

The left and the right seat rails 40L, 40R, are constructed of left and right halves each having substantially flat upper and lower surfaces and are formed by casting. In other words, the surfaces extending laterally of the vehicle (upper and lower surfaces) are substantially flat for enabling fabrication with a split mold, which can be divided laterally of the vehicle, when being molded.

Such left and the right seat rails 40L, 40R includes rail mounting portions 41 at the front end (left side of the drawing), fuel tank supporting portions 42, 42 formed behind the rail mounting portions 41, upper front coupling parts 43, 43 and lower front coupling parts 44, 44 formed behind the fuel tank supporting portions 42, 42. Rear coupling parts 45, 45 are formed behind the lower front coupling parts 44, 44, extensions 46, 46 extending from the rear ends (right side of the drawing) toward the centerline CL and extending longitudinally of the vehicle. Flanges 46a, 46a are provided for mating the extremities thereof with respect to each other, all of which are formed integrally.

The fuel tank supporting portions 42, 42 are through holes formed so as to pierce laterally of the vehicle.

The left and the right seat rails 40L, 40R are combined with each other by the steps of (1) superimposing an upper front cross member 47 on the upper front coupling parts 43, 43 from above so as to extend across therebetween and securing with securing members B1 such as bolts, (2) sandwiching a lower front cross member 48 between the lower front coupling parts 44, 44 and securing with securing members B2 such as bolts, (3) superimposing a rear cross member 49 on the rear coupling parts 45, 45 from above and securing with securing members B3 such as bolts, and (4) mating the flanges 46a, 46a and securing them with securing members B4 such as bolts.

In this manner, the seat rail 40 are casting having a substantially flat upper surface, including at least one cross member 47–49, and the cross member 47–49 can be mounted by securing members B1–B4 such as bolts after assembly.

As shown in FIG. 5, a hook plate 68 (seat mounting member 68) is formed of a plate material that may be mounted to the extensions 46, 46 by securing members B5, B5 such as bolts after assembly. The hook plate 68 is a member for mounting the rear portion of the rear seat 52 (See FIG. 1).

Figure 6:
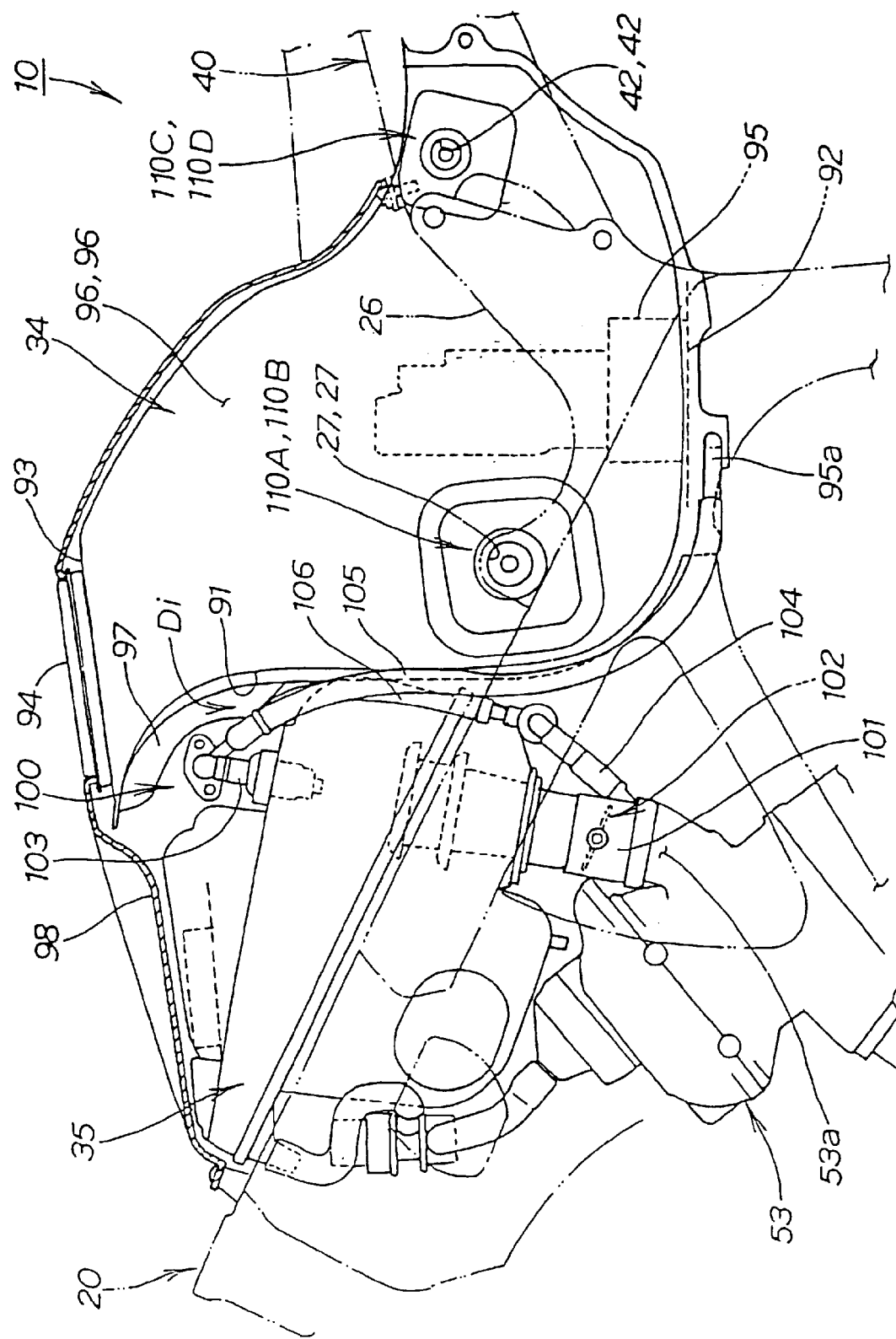
FIG. 6 is a left side view showing the area around an engine, a fuel tank, and an air chamber according to the present invention.

FIG. 6 is a left side view of an area around the engine, the fuel tank, and the air chamber according to the present invention. The air chamber 35 is disposed immediately above the engine 53, and the fuel tank 34 is disposed at the immediately behind the air chamber 35 with a gap Di being formed therebetween.

The fuel tank 34 includes a front wall 91 and a bottom plate 92 being substantially flat, a fuel port 94 formed on an upper plat 93, a fuel pump 95 on the bottom thereof, and mount portions formed on left and right side plates 96, 96 (first, second, third, and fourth mount portions 110A–110D).

As is clear from this drawing, the upper surface of the fuel tank 34 is at the level slightly higher than the upper surface of the air chamber 35. By bending only the upper portion of the front wall 91 so as to be concave on the lower side, and extending the same slightly toward the front, only the upper rear portion of the air chamber 35 is covered by an extended portion 97. An upper half of the fuel tank 34 and an upper half of the air chamber 35, that is, the portion projecting above the vehicle body frame 20 is covered by a cover 98. The cover 98 is detachably mounted to the vehicle body frame 20.

The engine 53 is a four-cylinder engine, that is provided with a fuel injection apparatus 100. This drawing shows that air intake passages 101 are connected to air intake ports 53a (aligned in the direction of the front and back sides of the drawing) for each cylinder. Throttle valves 102 are provided in the respective air intake passages 101, and the air chamber 35 is provided on the upstream ends of the air intake passages 101.

The fuel injection apparatus 100 is constructed in such a manner that first fuel injection valves 103 are mounted to the air chamber 35 on the upstream side of the throttle valves 102 for the respective cylinders, and second fuel injection valves 104 are mounted to the air intake passages 101 on the downstream side of the throttle valves 102 for the respective cylinders. The second fuel injection valves 104 are disposed at the level lower than the first fuel injection valves 103.

Only the second fuel injection valves 104 are used when the engine 53 is in a low power operation, and the first fuel injection valves 103 and the second fuel injection valves 104 are used in combination when in a high-low power operation, so that performance of the engine 53 is enhanced.

The fuel pump 95 includes a discharge port 95a at the lower end thereof, and the first fuel injection valves 103 can be connected to the discharge port 95a via a first fuel feed pipe 105. The first fuel injection valves 103 can be connected to the second fuel injection valves 104 via a second fuel feed pipe 106. Therefore, fuel in the fuel tank 34 can be supplied to the first and the second fuel injection valves 103, 104 via the fuel pump 95.

Furthermore, the first and the second fuel feed pipes 105, 106 are formed, for example, of a hose, and can be passed through the gap Di between the front wall 91 of the fuel tank 34 and the rear portion of the air chamber 35.

Figure 7:
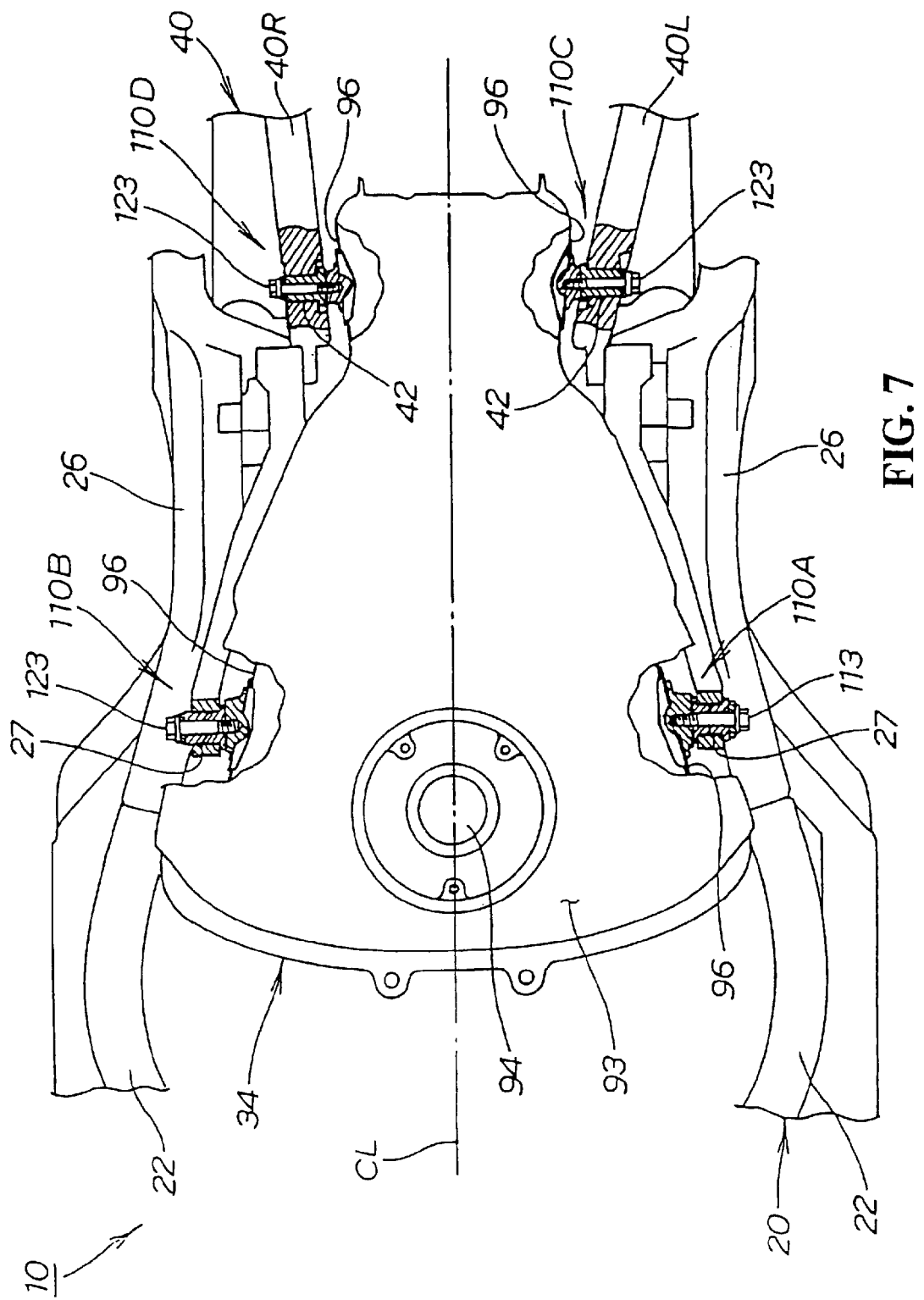
FIG. 7 is a plan view of a vehicle body frame and the fuel tank according to the present invention.

FIG. 7 is a plan view of the vehicle body frame and the fuel tank according to the present invention, showing that the fuel tank 34 is disposed between the left and the right main frames 22, 22 and between the left and the right seat rails 40L, 40R, and mounted at four points. More specifically, a first mounting portion 110A is mounted on a fuel tank supporting portion 27 of the left bracket 26, a second mounting portion 110B is mounted on a fuel tank supporting portion 27 of the right bracket 26, a third mounting portion 110c is mounted on the fuel tank supporting portion 42 of the left seat rail 40L, and a fourth mounting portion 110D is mounted on a fuel tank supporting portion 42 of the right seat rail 40R.

In the present invention, the seat rail 40 maybe integrated with the vehicle body frame 20 by welding or the like. Therefore, when explaining about the mounting structure below, the term "vehicle body frame 20" designates the vehicle body frame 20 including the seat rail 40.

Figure 8:
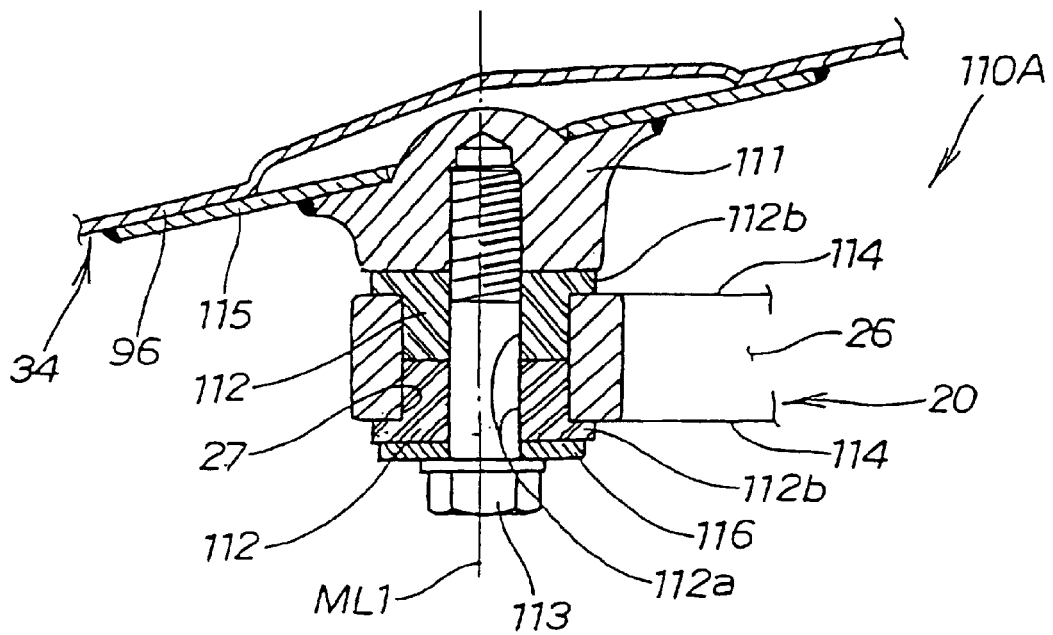
FIG. 8 is a cross-sectional view of a first mounting portion of the fuel tank according to the present invention.

FIG. 8 is a cross-sectional view of the first mounting portion of the fuel tank according to the present invention.

The first mounting portion 110A is mounted on the vehicle body frame 20 with the axes ML1 (center line ML1 of the tube) of the tubular resilient bodies 112, 112 extending laterally of the vehicle by attaching a boss (nut) 111 integrally with a left side plate 96 of the fuel tank 34 by welding or by integral molding, fitting flanged tubular resilient bodies 112, 112 into the fuel tank supporting portion 27 including the laterally pierced through hole, inserting a bolt 113 into holes 112a, 112a of the resilient bodies 112, 112, and screwing the bolt 113 into the boss 111.

Both surfaces in the lateral direction of the left bracket 26, that is, edge portions on both sides of the fuel tank supporting portion 27 are referred to as contact surfaces 114, 114. The resilient body 112 is, for example, a rubber product formed of resiliently deformable material having a flange 112b integrally therewith.

The mounting structure of the first mounting portion 110A is characterized in that the fuel tank 34 is supported resiliently in fore-and-aft direction and in the vertical direction of the vehicle but is limited in the lateral movement by clamping the left and the right contact surfaces 114, 114 by the left and the right flanges 112b, 112b, and securing the resilient bodies 112, 112 to the boss 111 with a bolt 113. The two resilient bodies 112, 112 may be formed into an integral member. A seat plate 115 and a flat washer 116 are provided.

Figure 9:
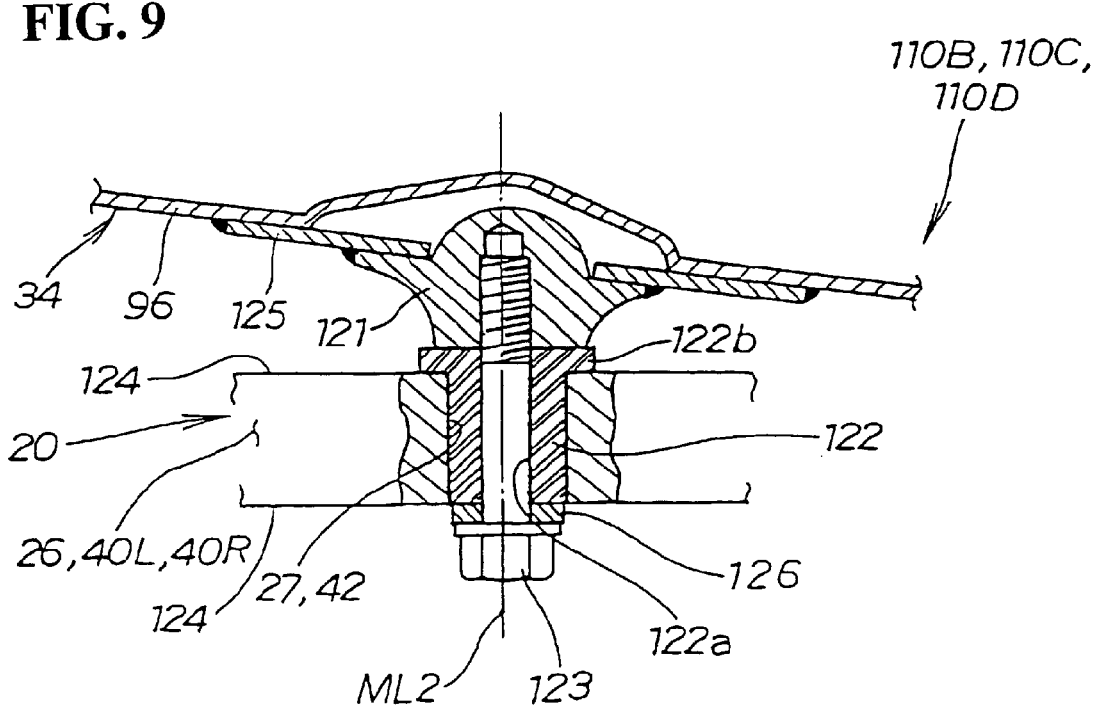
FIG. 9 is a cross-sectional view of a second, third, and fourth mounting portions of the fuel tank according to the present invention.

FIG. 9 is a cross-sectional view of the second, third, and fourth mounting portions of the fuel tank according to the present invention. The second, third and fourth mounting portions 110B, 110C, 110D are mounted on the vehicle body frame 20 with the axis ML2 (center line ML2 of the tube) being extending laterally of the vehicle by attaching a boss 121 (nut) to the side plate 96 of the fuel tank 34 integrally by welding or by integral molding, fitting a flanged tubular resilient body 122 into the fuel tank supporting portion 27 or 42 including the laterally pierced through hole, inserting a bolt 123 into a hole 122a of the resilient body 122, and screwing a bolt 123 into the boss 121.

Since the resilient body 122 is loosely fitted into the fuel tank supporting portion 27 or 42 including the through hole, when an external force is exerted in the lateral direction, the resilient body 122 can be moved laterally with respect to the fuel tank supporting portion 27 or 42.

Both surfaces in the lateral direction of the right bracket 26 and the left and the right seat rails 40L, 40R, that is, the edge portions on both sides of the fuel tank supporting portion 27 are referred to as contact surfaces 124, 124. The resilient body 122 is, for example, a rubber product formed of resiliently deformable material having the flange 122b integrally formed therewith.

The mounting structures of the second, third, and fourth mounting portions 110B to 110D are characterized in that the fuel tank 34 is supported resiliently both in the fore-and-aft direction and in the vertical direction of the vehicle by abutting the flange 122b against the contact surface 124 on the side of the widthwise center CL (See FIG. 7), and securing the resilient body 122 to the boss 121 with the bolt 123. A seat plate 125 and a flat washer 126 are provided.

The description described above will be summarized based on FIG. 7 to FIG. 9. The plurality of resilient bodies 112, 122 are arranged with the axes ML1, ML2 of the tubular resilient bodies 112, 122 extending laterally of the vehicle body. The resilient bodies 112, 112 allow resilient support in the fore-and-aft direction and in the vertical direction of the vehicle and limit the movement in the lateral direction. The remaining resilient bodies allow resilient support in the fore-and-aft direction, the vertical direction, and the lateral direction of the vehicle. Therefore, even when an excessive external force is exerted on left and right frame members 26, 26, 40L, 40R in the lateral direction, the excessive external force is not exerted from the frame members 26, 26, 40L, 40R to the fuel tank 34 via the resilient bodies 112, 122. Therefore, the fuel tank 34 is not subjected to an excessive external force in the lateral direction.

In addition, since the construction is such that at least one of the resilient bodies 112, 122 allows resilient support in the fore-and-aft direction and in the vertical direction of the vehicle, and limits the movement in the lateral direction, the position of the fuel tank 34 with respect to the vehicle body frame 20 can easily be determined.

In addition, since the tank mounting member does not exist in front and behind the fuel tank 34, spaces in front and behind the tank can effectively be used.

Furthermore, since a compact mounting structure is realized while securing the capacity of the fuel tank 34, weight saving of the motorcycle 10 is achieved.

With the arrangement describe above, the present invention brings out following advantages.

According to the present invention, the plurality of tubular resilient bodies are disposed with the axes of the tubular resilient bodies extends laterally of the vehicle, and at least one of the plurality of resilient bodies allows resilient support in the fore-and-aft direction and in the vertical direction of the vehicle and limits the movement in the lateral direction. The remaining resilient bodies allow resilient support both in the fore-and-aft direction and in the vertical direction of the vehicle, even when an external force is exerted on the left and the right frame members laterally of the vehicle. The external force is not exerted on the fuel tank via the resilient bodies.

In addition, since at least one resilient body is adapted to allow resilient support in the fore-and-aft direction and in the vertical direction and limits the movement in the lateral direction, the position of the fuel tank with respect to the vehicle body frame can easily be determined.

Furthermore, since the tank mounting member does not exist in front and behind the fuel tank, spaces in front and behind the tank can effectively be used.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A fuel tank mounting structure for a motorized two-wheeled vehicle wherein a fuel tank is disposed between a pair of left and right frame members of a vehicle body frame and the fuel tank is mounted on the vehicle body frame via a plurality of tubular resilient bodies comprising:

the plurality of tubular resilient bodies are disposed with axes of the tubular resilient bodies extending laterally of the vehicle; and at least one of the plurality of resilient bodies allows resilient support in the fore-and-aft direction and in the vertical direction of the vehicle and limits the movement in the lateral direction, and remaining resilient bodies allow resilient support both in the fore-and-aft direction and in the vertical direction of the vehicle, wherein said plurality of tubular resilient bodies includes four tubular resilient bodies wherein two are disposed adjacent to a forward section of the fuel tank and two are disposed adjacent to a rear section of the fuel tank.

2. The fuel tank mounting structure according to claim 1, wherein each of said tubular resilient bodies includes a fastener mounted relative thereto and further including a boss for each of said plurality of tubular resilient bodies being secured to said fuel tank for securing the fastener to said fuel tank.

3. The fuel tank mounting structure according to claim 1, wherein the at least one of the plurality of resilient bodies that allows resilient support in the fore-and-aft direction and in the vertical direction of the vehicle and limits the movement in the lateral direction includes a left flange and a right flange for clamping a left contact surface and a right contact surface for limiting the lateral movement.

4. The fuel tank mounting structure according to claim 3, wherein the at least one of the plurality of resilient bodies that allows resilient support in the fore-and-aft direction and in the vertical direction of the vehicle and limits the movement in the lateral direction includes a first and second section with said first section including the left flange and the second section including the right flange for clamping the left contact surface and the right contact surface for limiting the lateral movement.

5. The fuel tank mounting structure according to claim 3, and further including a fastener, said fastener extending relative to said at least one of the plurality of resilient bodies that allows resilient support in the fore-and-aft direction and in the vertical direction of the vehicle and limits the movement in the lateral direction to secure the fuel tank relative to the vehicle body frame.

6. The fuel tank mounting structure according to claim 3, wherein the at least one of the plurality of resilient bodies that allows resilient support in the fore-and-aft direction and in the vertical direction of the vehicle and limits the movement in the lateral direction is constructed of a resiliently deformable material.

7. The fuel tank mounting structure according to claim 1, wherein the remaining resilient bodies that allow resilient support both in the fore-and-aft direction and in the vertical direction of the vehicle include a single flange disposed adjacent to a contact surface to permit support in both the fore-and-aft direction and in the vertical direction of the vehicle without limiting the lateral movement.

8. The fuel tank mounting structure according to claim 7, and further including fasteners, said fasteners extending relative to said remaining resilient bodies to allow resilient support in the fore-and-aft direction and in the vertical direction of the vehicle and to secure the fuel tank relative to the vehicle body frame.

9. The fuel tank mounting structure according to claim 8, wherein the remaining resilient bodies that allow resilient support in the fore-and-aft direction and in the vertical direction of the vehicle are constructed of a resiliently deformable material.

10. A fuel tank mounting structure adapted for mounting a fuel tank relative to a frame member of a vehicle comprising:

a vehicle with a frame member;

a fuel tank;

a plurality of resilient bodies disposed with axes of the resilient bodies extending laterally of the vehicle for mounting the fuel tank relative to the frame member; and at least one of the plurality of resilient bodies allows resilient support in the fore-and-aft direction and in the vertical direction of the vehicle and limits the movement in the lateral direction, and remaining resilient bodies allow resilient support both in the fore-and-aft direction and in the vertical direction of the vehicle, wherein said plurality of tubular resilient bodies includes four tubular resilient bodies wherein two are disposed adjacent to a forward section of the fuel tank and two are disposed adjacent to a rear section of the fuel tank.

11. The fuel tank mounting structure according to claim 10, wherein each of said resilient bodies includes a fastener secured relative thereto and further including a boss for each of said plurality of resilient bodies being secured to said fuel tank for securing the fastener between the fuel tank and the frame member.

12. The fuel tank mounting structure according to claim 10, wherein the at least one of the plurality of resilient bodies that allows resilient support in the fore-and-aft direction and in the vertical direction of the vehicle and limits the movement in the lateral direction includes a left flange and a right flange for clamping a left contact surface and a right contact surface for limiting the lateral movement.

13. The fuel tank mounting structure according to claim 12, wherein the at least one of the plurality of resilient bodies that allows resilient support in the fore-and-aft direction and in the vertical direction of the vehicle and limits the movement in the lateral direction includes a first and second section with said first section including the left flange and the second section including the right flange for clamping the left contact surface and the right contact surface for limiting the lateral movement.

14. The fuel tank mounting structure according to claim 12 and further including a fastener, said fastener extending relative to said at least one of the plurality of resilient bodies that allows resilient support in the fore-and-aft direction and in the vertical direction of the vehicle and limits the movement in the lateral direction to secure the fuel tank relative to the vehicle body frame.

15. The fuel tank mounting structure according to claim 12, wherein the at least one of the plurality of resilient bodies that allows resilient support in the fore-and-aft direction and in the vertical direction of the vehicle and limits the movement in the lateral direction is constructed of a resiliently deformable material.

16. The fuel tank mounting structure according to claim 10, wherein the remaining resilient bodies that allow resilient support both in the fore-and-aft direction and in the vertical direction of the vehicle include a single flange disposed adjacent to a contact surface to permit support in both the fore-and-aft direction and in the vertical direction of the vehicle without limiting the lateral movement.

17. The fuel tank mounting structure according to claim 16, and further including fasteners, said fasteners each extending relative to said remaining resilient bodies to allow resilient support in the fore-and-aft direction and in the vertical direction of the vehicle and to secure the fuel tank relative to the vehicle body frame.

18. The fuel tank mounting structure according to claim 17, wherein the remaining resilient bodies that allow resilient support in the fore-and-aft direction and in the vertical direction of the vehicle are constructed of a resiliently deformable material.

* * * * *